Patented July 9, 1935

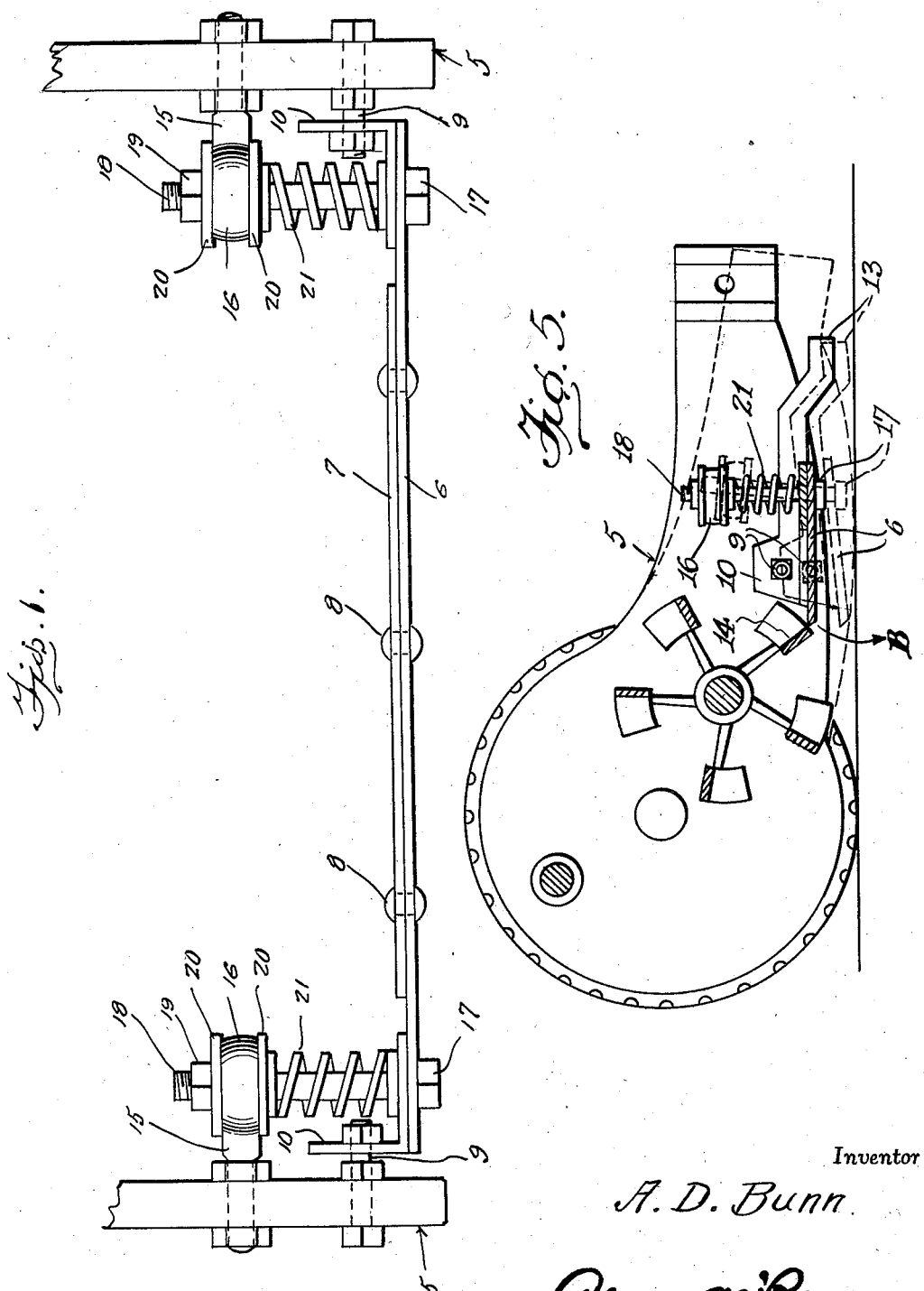

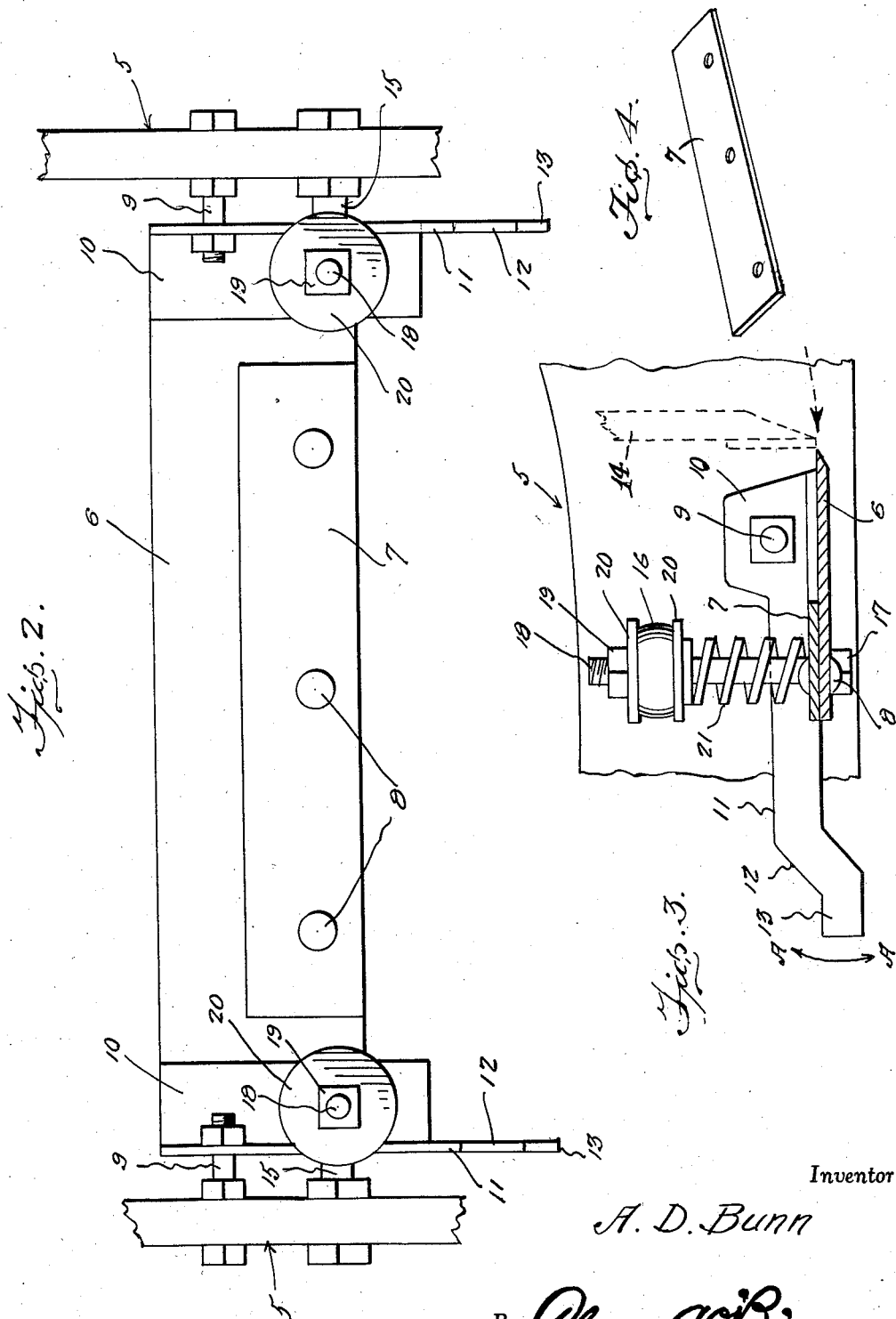

2,007,743

UNITED STATES PATENT OFFICE 2,007,743

SELF-ADJUSTING CUTTER BAR FOR LAWN MOWERS

Arthur D. Bunn, Savanna, Okla.

Application October 27, 1933, Serial No. 695,534

1 Claim. (Cl. 56—294)

This invention relates to an improved cutter bar for lawn mowers of a motor driven type, as well as the ordinary walking attendant pushed and steered style generally used for home or domestic purposes.

Stated otherwise, the invention is primarily adapted to a two-wheeled lawn mower of the form embodying a rotary driven bladed reel or rotor wherein the spiral blades swing successively into shearing and metallic sharpening contact with a horizontal bar mounted on the frame in the path of rotation of said blades.

In carrying the principles of the present inventive conception into actual practice, I have evolved and produced a novel and practicable bar construction and mounting wherein said bar is suspended for oscillation in a limited arc and is itself made of flexible steel susceptible of flexing in a manner to be self-accommodating and adjusting and to thereby attain the desired features of shape, conformation and adaptation believed to be more satisfactory in promoting severing of the grass and self-sharpening of the blades of the reel.

In selecting a structure capable of accomplishing these results, I have provided an arrangement which is believed to be scientifically and mechanically correct, appropriately balanced, aptly fitted for the purposes intended and characterized by features of accommodations and adaptation which transcend those of similar known arrangements.

Other features and advantages will become more readily apparent from the following description and the accompanying illustrative drawings.

In the drawings, wherein like numerals are employed to designate like parts throughout the views:—

Figure 1 is a front elevational view of the assembly, showing the manner in which it is attached to the lawn mower frame or support.

Figure 2 is a top plan view of the assembly shown in Figure 1.

Figure 3 is a transverse or cross sectional view.

Figure 4 is a detail perspective view.

Figure 5 discloses a view showing the cutter bar attached to a lawn mower.

Referring now to the drawings by detailing and distinguishing reference characters, it will be observed that the numeral 5 designates like portions of a conventional lawn mower (not shown). The cutter bar per se is denoted by the numeral 6 and comprises a rectangular plate or strip of pliant steel. Attached to the intermediate portion thereof is a reinforcing plate 7 secured by rivets or the like 8, this being of appriate proportions and shape to afford the desired degree of rigidity and at the same time permit the requisite resilient properties. In opposite ends of the bar are pivot bolts 9 appropriately secured to the lawn mower frame structure. These serve as supports for hanger units for the bar 6. These units are here shown as of right angular form and differentiated by the numeral 10. The vertical flanges thereof are apertured and mounted for oscillation on the pivot pins 9. As shown in Figure 3, the pivotal connections for these suspension or hanger brackets 10 are such as to allow the rear longitudinal edge portion of the bar to be tilted rearwardly and downwardly. Incidently, and under certain conditions, these brackets 10 are provided with rearwardly projecting arm-like extensions 11 which, as shown in Figure 3, have their extreme rear ends inclined downwardly at 12 to terminate in ground engaging feet 13. These features 11, 12 and 13 form what may be designated as a trip device. There is a device at each end of the bar 6 and the rear terminal or foot 13 is swingable in the direction of the arrows A and when it swings upwardly, it tilts the shearing edge of the bar 6 downwardly in the direction of the arrow B and away from the blades of the reel or rotor 14. In the ordinary conventional type of lawn mower having the rearwardly extending handle bar, it is obvious that when said handle bar is released, the feet 13 drop down into contact with the ground, thus swinging the shearing edge of the bar 6 away from the cutting blades so as to provide a desired degree of clearance. This is particularly useful in electric motor driven types of lawn mowers in that it permits free rotation of the bladed rotor when the motor is started and before the handle bar (not shown) is lifted to steer the lawn mower.

The means for automatically adjusting the bar 6 into the path of movement of the rotating blade is of an automatic type. The preferred embodiment thereof comprises spring devices of a duplicate type mounted on the frame at opposite ends of the bar. Each device comprises a supporting fixture. This is here shown as in the form of an eye bolt whose shank 15 is attached to the frame and whose eye 16 serves as a guide and support for a bolt 17. The headed end of the bolt is connected with one end portion of the bar 6 at a point rearwardly of the pivotal suspension of said bar, as shown in Figure 3. The upper threaded end 18 is provided with an adjusting and retaining nut 19 and the numerals 20 merely designate guide and stabilizing washers. The numeral 21 designates a coiled spring which surrounds the shank of the bolt between the end portion of the bar and the bolt supporting fixture. The spring can be tensioned as conditions require to permit the sensitivity of control to be adequately regulated.

The gist of the invention is found in the provision of a suitably reinforced flexible steel bar 6 having its end portions mounted for oscillation on the frame of a lawn mower, together with adjustable spring pressed means on said frame cooperable with the rear longitudinal edge portion of the bar to bring about the desired tilting action and to tilt the shearing front edge of the bar into sharpening and shearing contact with the blades of the rotor. This spring pressed arrangement renders the bar 6 substantially self-accommodating and adjusting with respect to the cutting blade. Not only this, the flexible properties of the bar itself are such as to permit it to present the desired inherent resilient characteristics, allowing it to twist transversely and to allow it to conform in shape to the progressive "feed-in" action of the spiral cutting blades. It is to be remembered that the entire cutting edge of the blade does not come into contact with the bar at once, but gradually feeds into contact and the resiliency of the bar 6 allows said bar to shape itself to the pressure developed against it by the incoming blade. This double oscillation and twist result provides for the requisite compensating action necessary. It is particularly advantageous in an arrangement of this kind wherein the blades are progressively or successively brought into shearing and sharpening contact with the bar 6.

Emphasis is also placed on the extension arms 11 which constitute trip devices to overcome the tension of the springs and to swing the shearing edge of the plate or bar downwardly in the direction of the arrows A, as shown in Figure 3, to provide for clearance when said clearance is needed. When these arms 11 are used, it is generally advisable to omit the usual ground engaging roller (not shown) found on conventional lawn mowers.

It is thought that the description, taken in connection with the drawings, will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:—

In a cutter bar attachment for lawn mowers having a frame and a rotary cutting member, a cutter bar pivoted to said frame rearwardly of the rotary cutting member, yieldable means carried by said frame and connected to said cutter bar rearwardly of the pivot therefor for urging said cutter bar into engagement with the rotary cutting member, and an extension carried by and projecting rearwardly and downwardly from the cutter bar and adapted to be engageable with the ground for moving the cutter bar out of contact with the rotary cutting member.

ARTHUR D. BUNN.